United States Patent
Kwon et al.

(10) Patent No.: US 9,213,932 B2
(45) Date of Patent: Dec. 15, 2015

(54) COMMUNICATION SYSTEM USING WIRELESS POWER

(75) Inventors: Ui Kun Kwon, Hwaseong-si (KR); Sang Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 893 days.

(21) Appl. No.: 13/433,478

(22) Filed: Mar. 29, 2012

(65) Prior Publication Data

US 2013/0080091 A1  Mar. 28, 2013

(30) Foreign Application Priority Data

Sep. 27, 2011  (KR) .................. 10-2011-0097543

(51) Int. Cl.
   *G06K 19/07*  (2006.01)
(52) U.S. Cl.
   CPC .................. *G06K 19/0712* (2013.01)
(58) Field of Classification Search
   CPC ............. H03F 3/19; H03F 3/195; H03F 3/24; H03F 1/3294; H03F 1/3247
   USPC .............. 327/58; 375/224, 355, 322
   See application file for complete search history.

(56) References Cited

U.S. PATENT DOCUMENTS

| | | |
|---|---|---|
| 2005/0129141 A1* | 6/2005 | Lee .............................. 375/298 |
| 2006/0103457 A1 | 5/2006 | Kumar et al. |
| 2010/0189196 A1 | 7/2010 | Wang et al. |
| 2010/0244580 A1 | 9/2010 | Uchida et al. |
| 2010/0248622 A1 | 9/2010 | Lyell Kirby et al. |
| 2011/0018494 A1 | 1/2011 | Mita |
| 2011/0074218 A1 | 3/2011 | Karalis et al. |

FOREIGN PATENT DOCUMENTS

| | | |
|---|---|---|
| JP | 06-152473 | 5/1994 |
| JP | 2004-501540 A | 1/2004 |
| JP | 2010-284065 A | 12/2010 |
| KR | 10-2011-0009228 A | 1/2011 |

OTHER PUBLICATIONS

Extended European Search Report issued Feb. 4, 2013 in counterpart European Patent Application No. 12171191.5 (6 pages, in English).

* cited by examiner

*Primary Examiner* — John Poos
(74) *Attorney, Agent, or Firm* — NSIP Law

(57) ABSTRACT

Provided is a device and system for performing communication using wireless power, and a communication device using wireless power. The device may calculate a slope of an envelope in a waveform of energy stored in a target resonator through mutual resonance with a source resonator, and estimate a point placed within a predetermined interval around a point at which the slope reaches a maximum as a starting point of the mutual resonance between the source resonator and the target resonator.

21 Claims, 11 Drawing Sheets

COMMUNICATION SYSTEM USING WIRELESS POWER

CROSS-REFERENCE TO RELATED APPLICATION(S)

This application claims the benefit under 35 USC §119(a) of Korean Patent Application No. 10-2011-0097543, filed on Sep. 27, 2011, in the Korean Intellectual Property Office, the entire disclosure of which is incorporated herein by reference for all purposes.

BACKGROUND

1. Field

The following description relates to an apparatus and system for communication using wireless power.

2. Description of Related Art

Research into wireless power transmission has been conducted to address various issues such as the limited capacity of a battery, an increasing inconvenience of a wired power provision due to explosions of various devices including portable devices, and the like. Much of the research has been focused on near-field wireless power transmission. Near-field wireless power transmission refers to a case in which a distance between transmission and reception coils is sufficiently short in comparison to a wavelength at an operating frequency.

A wireless power transmission and reception system using a resonance characteristic may include a source for providing power and a target for receiving power. During the process of transmitting and receiving wireless power, the source and the target may share control information. To share the control information, synchronization may be performed between the source and the target.

SUMMARY

In one general aspect, there is provided a communication device using wireless power, the communication device including a calculator configured to calculate a slope of an envelope in a waveform of energy stored in a target resonator through mutual resonance with a source resonator, and an estimation unit configured to estimate a point placed within a predetermined interval around a point at which the slope reaches a maximum as a starting point of the mutual resonance between the source resonator and the target resonator.

The communication device may further comprise an envelope detector configured to detect an envelope in a waveform of a current or a voltage applied to the target resonator.

The calculator may be configured to calculate a slope between two points having a predetermined interval on the detected envelope.

The calculator may be configured to calculate a slope of a tangent at a plurality of points along the detected envelope.

The communication device may further comprise a frame detector to detect a frame transmitted from the source resonator by measuring a magnitude of a signal applied to the target resonator during a predetermined sliding window period.

The frame may comprise a preamble region used for detecting the frame transmitted from the source resonator, for estimating the starting point of the mutual resonance between the source resonator and the target resonator, and for detecting a capture point of the energy stored in the target resonator, and a body region used for transmitting energy and transmitting data from the source resonator to the target resonator.

The communication device may further comprise a controller configured to maintain the target resonator in an activated state so that the target resonator promptly receives energy through mutual resonance in response to the source resonator transmitting energy.

The communication device may further comprise a signal accumulation unit configured to accumulate signals applied to the target resonator during a predetermined period including the predetermined sliding window period.

The calculator may be configured to calculate a slope of an envelope detected from the accumulated signals.

The envelope detector may be configured to acquire the envelope from an output of an analog circuit for detecting an envelope in response to an input of the current or the voltage.

The envelope detector may comprise a down conversion unit configured to generate a down-converted signal by multiplying a predetermined signal waveform of a resonant frequency by a signal that is analog-digital conversion (ADC) sampled from the current or the voltage, a transformer configured to transform the down-converted signal into a frequency domain signal using the discrete Fourier transform (DFT) or the fast Fourier transform (FFT), a filtering unit configured to generate a signal from which a harmonic component is removed by applying low-pass filtering to the frequency domain signal, and an inverse transformer configured to transform the signal from which a harmonic component is removed, into a time domain signal using the inverse DFT or the inverse FFT.

The envelope detector may comprise a transformer configured to transform a signal that is ADC sampled from the current or the voltage into a frequency domain signal using the DFT or the FFT, a circular shifter configured to perform a circular shift of the frequency domain signal by a predetermined frequency, a filtering unit configured to generate a signal from which a harmonic component is removed by applying low-pass filtering to the circular-shifted signal, and an inverse transformer configured to transform the signal from which a harmonic component is removed, into a time domain signal using the inverse DFT or the inverse FFT.

The envelope detector may comprise a down conversion unit configured to generate a down-converted signal by multiplying a predetermined signal waveform of a resonant frequency by a signal that is ADC sampled from the current or the voltage, and a filtering unit configured to generate a signal from which a harmonic component is removed by applying low-pass filtering to the down-converted signal using convolution in a time domain.

The communication device may further comprise a peak point detector configured to detect a peak point corresponding to a point at which an amplitude of the detected envelope reaches a maximum value, and a capturing unit configured to capture the energy stored in the target resonator at the detected peak point.

The communication device may further comprise a receiver configured to receive energy transmitted from the source resonator by activating a self resonance of the target resonator based on the starting point of the mutual resonance, a demodulator configured to demodulate information transmitted by the source resonator based on an amount of energy received, and a modulator configured to modulate information transmitted to the source resonator based on a mutual resonance between the source resonator and the target resonator.

In another aspect, there is provided a communication method using wireless power, the communication method including calculating a slope of an envelope in a waveform of energy stored in a target resonator through mutual resonance with a source resonator, and estimating a point placed within a predetermined interval around a point at which the slope reaches a maximum as a starting point of the mutual resonance between the source resonator and the target resonator.

The communication method may further comprise detecting an envelope in a waveform of a current or a voltage applied to the target resonator.

The calculating may comprise calculating a slope between two points having a predetermined interval on the detected envelope.

The communication method may further comprise maintaining the target resonator in an activated state so that the target resonator promptly receives energy through mutual resonance, in response to the source resonator transmitting energy.

The communication method may further comprise detecting a peak point corresponding to a point at which an amplitude of the detected envelope reaches a maximum value, and capturing the energy stored in the target resonator at the detected peak point.

In another aspect, there is provided a communication system using wireless power, the communication system including a transmitter configured to transmit energy stored in a source resonator to a target resonator through mutual resonance, an envelope detector configured to detect an envelope in a waveform of energy stored in the target resonator through the mutual resonance, a calculator configured to calculate a slope of the detected envelope, and an estimation unit configured to estimate a point placed within a predetermined interval around a point at which the slope reaches a maximum as a starting point of the mutual resonance between the source resonator and the target resonator.

Other features and aspects will be apparent from the following detailed description, the drawings, and the claims.

Figure 1:
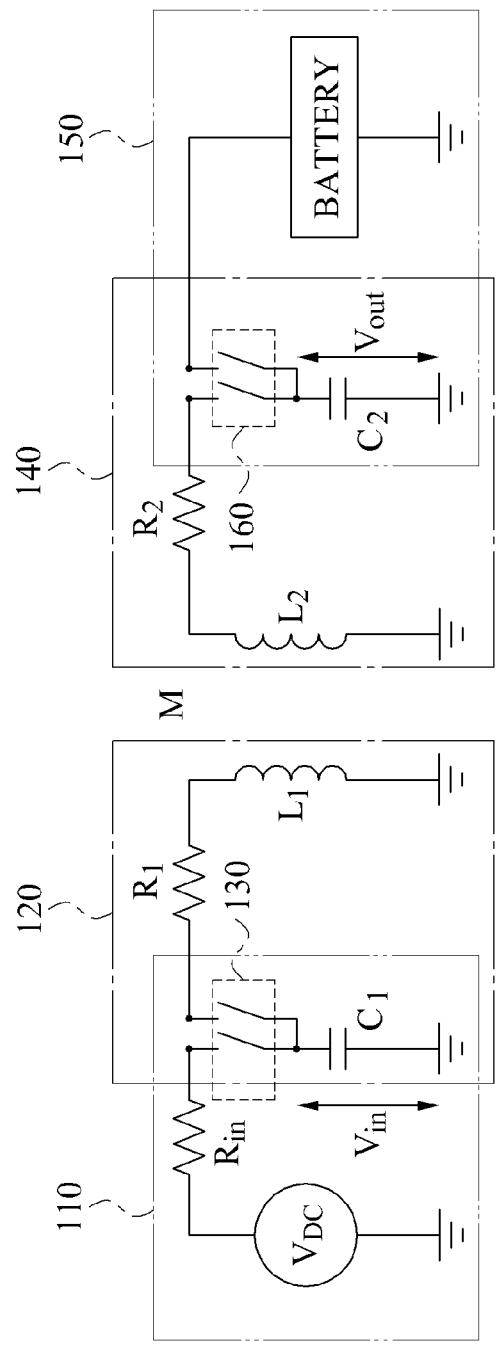
FIG. 1 is a diagram illustrating an example of an equivalent circuit of a communication system using wireless power.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

A wireless power communication system may be applied to various systems that use wireless power transmission. The communication system may be used for exchanging control information and other types of information between a transmission end and a reception end. Examples of devices that may use wireless power transmission include a cell phone, a wireless television (TV), a terminal, a tablet, an appliance, and the like.

In various examples, the wireless power communication system may be applied to a bio-healthcare field. For example, the wireless power communication device may be used for remotely transmitting power to a device that is inserted into a body, or for wirelessly transmitting power to a bandage-type device for measuring a bio-signal such as a heartbeat.

As another example, the wireless power communication system may be applied to a remote control of an information storage device that may not include a power source. For example, the wireless power communication system may remotely provide power for driving a device to the information storage device, and for wirelessly loading information stored in the information storage device.

The wireless power communication system may generate a signal by storing energy from a power supply device in a source resonator, and turning off a switch that electrically connects the power supply device and the source resonator, thereby inducing self-resonance of the source resonator. In this example, if a target resonator having the same resonant frequency as a resonant frequency of a self-resonating source resonator is sufficiently near to the source resonator to couple with the source resonator, a mutual resonance may occur between the source resonator and the target resonator. As a result, power may be wirelessly transmitted from the source resonator to the target resonator.

In various example, the source resonator may refer to a resonator that is provided with energy from a power supply device such as a wired or wireless power supply, and the target resonator may refer to a resonator receiving energy delivered through mutual resonance with the source resonator.

Various examples herein are directed towards a transmitter and a receiver. The transmitter may include a wireless power transmitter and the receiver may be any device capable of receiving power wirelessly, for example, a terminal, a smart phone, a computer, a tablet, an appliance, a television, a sensor, and the like.

FIG. 1 illustrates an example of an equivalent circuit of a communication system using wireless power. In this example, a power input unit 110 and a power transmission unit 120 are physically isolated by a capacitor $C_1$ and a switch unit 130. Further, a receiver 140 and a power output unit 150 are physically isolated by a capacitor $C_2$ and a switch unit 160.

Referring to FIG. 1, the communication system may correspond to a source-target configuration having a source and a target. That is, the communication system may include a wireless power transmission device corresponding to a source and a wireless power reception device corresponding to a target.

In this example, the wireless power transmission device includes the power input unit 110, the power transmission unit 120, and the switch unit 130. The power input unit 110 may store energy in the capacitor $C_1$ that is received from a power supply device. The switch unit 130 may connect the capacitor $C_1$ to the power input unit 110 to supply energy to the capacitor $C_1$, and may disconnect the capacitor $C_1$ from the power input unit 110, and connect the capacitor $C_1$ to the power transmission unit 120 while energy stored in the capacitor $C_1$ is discharged. In this example, the switch unit 130 may prevent the capacitor $C_1$ from being simultaneously connected to the power input unit 110 and the power transmission unit 120.

The power transmission unit 120 may transfer electromagnetic energy to the receiver 140. For example, a transmission coil $L_1$ of the power transmission unit 120 may transfer power through mutual resonance with a reception coil $L_2$ of the receiver 140. A level of mutual resonance occurring between the transmission coil $L_1$ and reception coil $L_2$ may be affected by a mutual inductance M.

In this example, the power input unit 110 includes an input voltage $V_{DC}$, an internal resistance $R_{in}$, and a capacitor $C_1$. The power transmission unit 120 includes basic circuit elements $R_1$, $L_1$, and $C_1$ which reflect a physical property corresponding to the power transmission unit 120, and the switch unit 130 may include a plurality of switches or a single switch. An active device may be used as a switch to perform an on and off function. As described herein, R denotes a resistance component, L denotes an inductor component, and C denotes a capacitance component. A voltage across the capacitor $C_1$ corresponding to a portion of the input voltage $V_{DC}$ is indicated by $V_{in}$.

The wireless power reception device includes the receiver 140, the power output unit 150, and the switch unit 160. The receiver 140 may receive electromagnetic energy from the power transmission unit 120. For example, the receiver 140 may store received electromagnetic energy in a capacitor. The switch unit 160 may connect the capacitor $C_2$ to the receiver 140 while energy is stored in the capacitor $C_2$, and may disconnect the capacitor $C_2$ from the receiver 140 so that the capacitor $C_2$ may be connected to the power output unit 150 so that energy stored in the capacitor $C_2$ may be delivered to a load. The switch unit 160 may prevent the capacitor $C_2$ from being simultaneously connected to the receiver 140 and the power output unit 150.

A reception coil $L_2$ of the receiver 140 may receive power through a mutual resonance with the transmission coil $L_1$ of the power transmission unit 120. The capacitor $C_2$ connected to the reception coil $L_2$ may be charged with the received power. For example, the power output unit 150 may deliver the power charged in the capacitor $C_2$ to a battery. As another example, the power output unit 150 may deliver the power to a load or a target device instead of the battery.

In this example, the receiver 140 includes basic circuit elements $R_2$, $L_2$, and $C_2$ by reflecting a physical property corresponding to the receiver 140, the power output unit 150 includes the capacitor $C_2$ and the battery, and the switch unit 160 may include a plurality of switches or a single switch. A voltage across the capacitor $C_2$ corresponding to a portion of the energy received by the reception coil $L_2$ is indicated by $V_{out}$.

As described in the foregoing, a resonator isolation (RI) system for transmitting power by physically isolating the power input unit 110 and the power transmission unit 120, and the receiver 140 and the power output unit 150 may improve the power transmission in comparison to a conventional scheme using an impedance matching. For example, a power amplifier may not be necessary because power may be supplied directly from a direct current (DC) source to a source resonator. Further, rectification through a rectifier may not be necessary because energy is captured from power stored in a capacitor at a reception end. Transmission efficiency may not be responsive to a change in a distance between a transmission end and a reception end because impedance matching may not be used. The RI system may be easily extended to a communication system that uses wireless power and includes a plurality of transmission ends and a plurality of reception ends.

Figure 2:
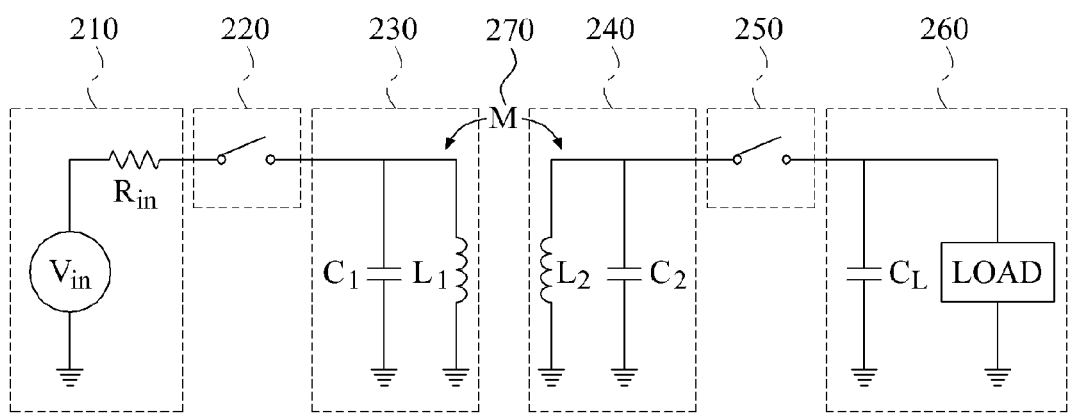
FIG. 2 is a diagram illustrating another example of an equivalent circuit of a communication system using wireless power.

FIG. 2 illustrates another example of an equivalent circuit of a communication system using wireless power. In this example, a power charger 210 and a transmitter 230 are physically isolated by a switch, and a charger 240 and a power output unit 260 are physically isolated by another switch.

Referring to FIG. 2, the wireless power transmission device includes the power charger 210, a controller 220, and the transmitter 230. The power charger 210 includes a power supply device $V_{in}$, and a resistor $R_{in}$. A source resonator includes a capacitor $C_1$ and an inductor $L_1$. The transmitter 230 may transmit energy stored in the source resonator through mutual resonance between the source resonator and a target resonator. The controller 220 may turn the switch on to provide power from the power charger 210 to the source resonator.

The power supply device $V_{in}$, may apply a voltage to the capacitor $C_1$, and may apply a current to the inductor $L_1$. For example, in response to the wireless power transmission device reaching a steady state, a voltage applied to the capacitor $C_1$ may become "0," and a current flowing through the inductor $L_1$ may have a value of $V_{in}/R_{in}$. At the steady state, the inductor $L_1$ may be charged through the applied current.

The controller 220 may turn the switch off if power stored in the source resonator reaches a predetermined value at the steady state. The predetermined value may be set in the controller 220. In this example, the power charger 210 and the transmitter 230 may be isolated from each other. In this instance, the source resonator may initiate a self-resonance between the capacitor $C_1$ and the inductor $L_1$. That is, energy stored in the source resonator may be delivered to the target resonator through mutual resonance between the source resonator and the target resonator based on a mutual inductance M 270. In this instance, a resonant frequency $f_1$ of the source resonator may be equal to a resonant frequency $f_2$ of the target resonator as shown in Equation 1.

$$f_1 = \frac{1}{2\pi\sqrt{L_1 C_1}},$$
$$f_2 = \frac{1}{2\pi\sqrt{L_2 C_2}}$$
$$f_1 = f_2$$

Equation (1)

The wireless power reception device includes the charger 240, a controller 250, and the power output unit 260. The target resonator includes a capacitor $C_2$ and an inductor $L_2$. While mutual resonance occurs between the source resonator and the target resonator, the source resonator may be isolated from the power supply device $V_{in}$, and the target resonator may be isolated from a load and a capacitor $C_L$. The capacitor $C_2$ and the inductor $L_2$ of the target resonator may be charged through a mutual resonance. The controller 250 may turn a switch off to charge the target resonator. While the switch is in an off state, a resonant frequency of the source resonator may be equal to a resonant frequency of the target resonator, and mutual resonance may occur. For example, in response to power charged in the target resonator reaching a predetermined value, the controller 250 may turn the switch on. The predetermined value may be set in the controller 250. When the switch is turned on, the capacitor $C_L$ may be connected to the target resonator, and a resonant frequency of the target resonator may change as shown in Equation 2.

$$f_2' = \frac{1}{2\pi\sqrt{L_2(C_2 + C_L)}} \quad \text{Equation (2)}$$

Thus, the mutual resonance between the source resonator and the target resonator may be terminated. If $f_2'$ is sufficiently small in comparison to $f_2$, in consideration of Q(Quality) factor of the target resonator, a mutual resonant channel may cease to exist. The power output unit 260 may deliver, to the load, power stored in the capacitor $C_2$ and the inductor $L_2$. For example, the power output unit 260 may deliver power in a scheme appropriate for the load.

The controller 250 may turn the switch off when power charged in the target resonator has a value less than a predetermined value. The charger 240 may charge the target resonator through a mutual resonance between the source resonator and the target resonator.

In this example, the switch may be turned off when a mutual resonance occurs between the source resonator and the target resonator. Thus, a decrease in transmission efficiency due to a connection of a switch may be prevented.

When the analog circuit of FIG. 2 is compared to an equivalent circuit of FIG. 1 in which energy charged in a capacitor is delivered, it may be easier to control a point in time of capturing energy stored in the target resonator in the analog circuit of FIG. 2. While the scheme of delivering energy charged in a capacitor may capture energy stored in the capacitor, a scheme of capturing energy by changing a resonant frequency may capture energy stored in an inductor and a capacitor of the target resonator and thus, a degree of freedom for the point in time of capturing energy may be enhanced.

A transmission end of an RI system may repeatedly charge or discharge a source resonator with energy through a connection of a switch between a power supply and the source resonator to transmit power or data. In this example, a single charging and discharging operation may be defined as a single symbol. A switch may operate at a reception end with appropriate time synchronization according to operation intervals of a switch for repeatedly charging and discharging at the transmission end so as to receive energy or data transmitted from the transmission end. A time synchronization operation for maintaining time synchronization to be constant according to an operation at the transmission end may be performed continuously at the reception end.

The reception end may be informed about a point in time when the switch at the transmission end turns off and turns on, when a mutual resonance starts, and when energy stored in the target resonator has a peak value. An operation of searching for information related to an on and off timing of a switch at the transmission end, and operating the switch according to information related to an on and off timing at a reception end may be defined as a time synchronization operation.

Figure 3:
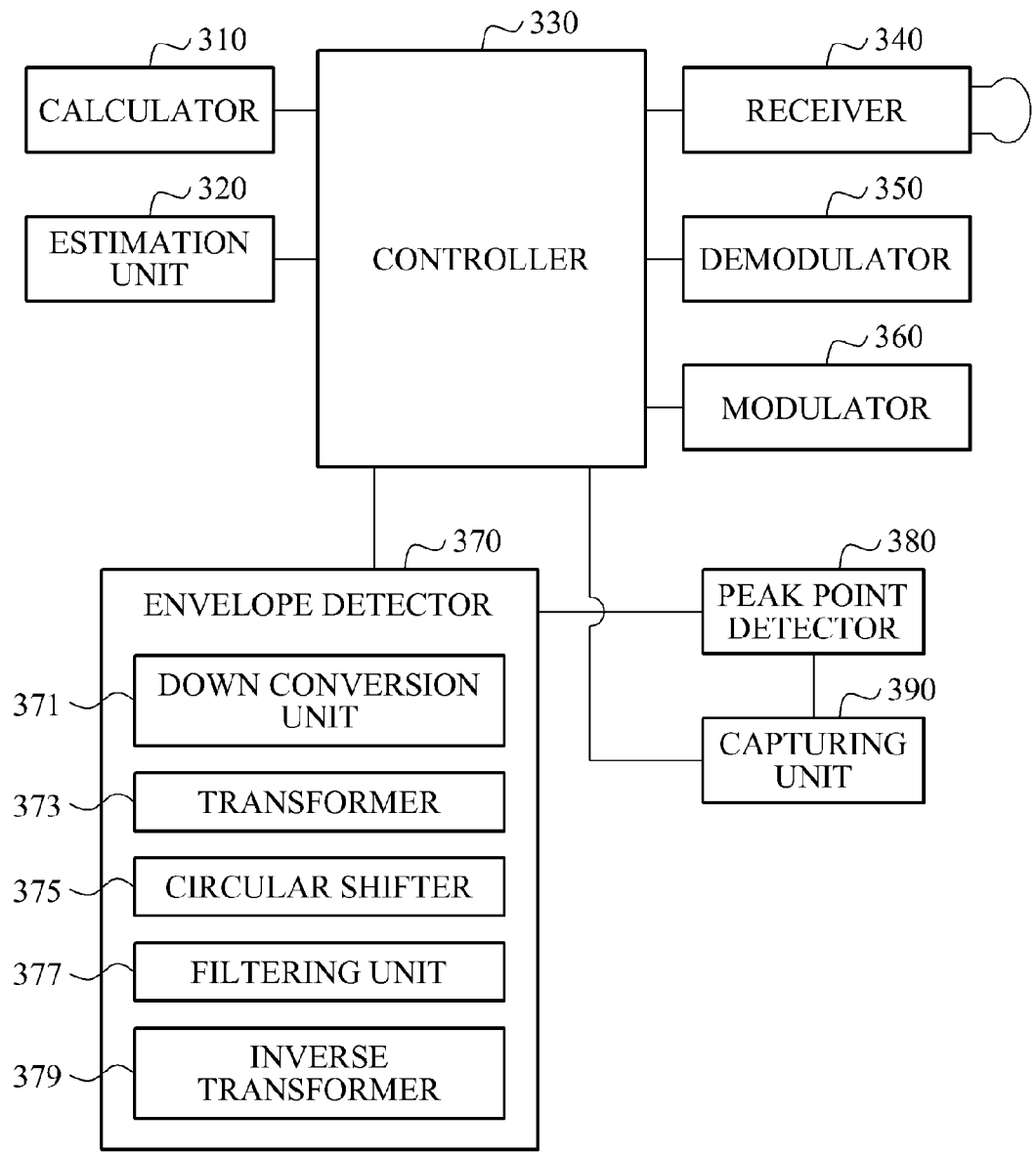
FIG. 3 is a diagram illustrating an example of a communication device using wireless power.

FIG. 3 illustrates an example of a communication device using wireless power.

Referring to FIG. 3, the communication device includes a calculator 310, an estimation unit 320, a controller 330, a receiver 340, a demodulator 350, a modulator 360, an envelope detector 370, a peak point detector 380, and a capturing unit 390. Hereinafter, the communication device may refer to a reception end receiving wireless power. It should also be understood that the communication device may not include one or more of the components that are shown in FIG. 3.

The receiver 340 may receive energy through mutual resonance between a target resonator and a source resonator. The envelope detector 370 may detect an envelope from a waveform of energy stored in the target resonator.

The calculator 310 may calculate a slope of the envelope in the detected envelope. For example, the calculator 310 may calculate a slope between two points that have a predetermined interval on the detected envelope. As an example, the calculator 310 may calculate a slope of a tangent at a plurality of points along the detected envelope.

The estimation unit 320 may estimate a point placed within a predetermined interval around a point at which the slope reaches a maximum as a starting point of the mutual resonance between the source resonator and the target resonator. For example, the predetermined interval around a point may be zero. The predetermined interval around a point may be determined base on a distance between the source resonator and the target resonator. The slope of the envelope may reach a maximum at a point in time when a mutual resonance starts between a transmission end for transmitting wireless power and a reception end for receiving wireless power. The estimation unit 320 may estimate a starting point of the mutual resonance using the following Equation 3.

$$\text{signal\_start\_point} = \max_i\{\text{envelope}(i+\text{gap}) - \text{envelope}(i)\} \quad \text{Equation (3)}$$

In Equation 3, "signal_start_point" denotes the starting point of the mutual resonance, "i" denotes a point on the envelope, and "gap" denotes a predetermined interval between two points on the envelope. That is, the "signal_start_point" may be estimated to be "i" in a case in which a slope between two points having a predetermined interval on the envelope reaches a maximum.

If an envelope is accurately detected from a waveform of energy stored in the target resonator, a point in time at which a mutual resonance starts between the transmission end and the reception end may be accurately estimated. The envelope detector 370 may detect an envelope in a waveform of a current or a voltage that is applied to the target resonator. Accordingly, a waveform of energy stored in the target resonator may be expressed as a current or as a voltage applied to the target resonator.

The envelope detector 370 may acquire an envelope from an output of an analog circuit for detecting an envelope, in response to an input of a current or a voltage applied to the target resonator.

The detection of an amount of energy stored in the target resonator may be performed through an analog-digital conversion (ADC) sampling of a current or voltage applied to the target resonator. To accurately detect an amount of energy, an ADC sampling rate may be greater than a resonant frequency of the target resonator. For example, if the ADC sampling rate is relatively great, an analog-digital converter may consume a relatively large amount of power, and energy transmission efficiency and data transmission efficiency may be greatly affected by the ADC sampling rate and a number of quantization bits. The envelope detector 370 may accurately detect an amount of energy stored in the target resonator while using the ADC sampling rate.

For example, the analog circuit for detecting an envelope may be a diode, a capacitor, a load, and the like. In this instance, the analog circuit may output an envelope of a current applied to the target resonator or a voltage applied to the target resonator, in response to an input of the current applied to the target resonator or the voltage applied to the target resonator.

As an example, the envelope detector 370 may detect the envelope by applying signal processing to a current or a voltage applied to the target resonator. In the example of FIG. 3, the envelope detector 370 includes a down conversion unit 371, a transformer 373, a circular shifter 375, a filtering unit 377, and an inverse transformer 379. However, the envelope detector 370 is not limited thereto.

The down conversion unit 371 may generate a down-converted signal by multiplying one of predetermined signal waveforms of a resonant frequency by a signal that is ADC sampled from a current or a voltage applied to the target resonator. For example, the predetermined signal waveforms may include a sine waveform, a cosine waveform, an exponential waveform of a resonant frequency, and the like. A down conversion scheme may use a scheme generally used in communication. For example, the down conversion unit 371 may down-convert an ADC sampled signal to a baseband.

The transformer 373 may transform the down-converted signal into a frequency domain signal, for example, using discrete Fourier transform (DFT) or fast Fourier transform (FFT). The filtering unit 377 may generate a signal from which a harmonic component is removed by applying low-pass filtering to the frequency domain signal. The harmonic component may refer to a noise component included in the frequency domain signal. The inverse transformer 379 may transform the signal from which a harmonic component is removed, into a time domain signal using, for example, inverse DFT or inverse FFT. In this example, the transformed time domain signal may indicate an envelope of a waveform of a current or a voltage applied to the target resonator.

The transformer 373 may transform a signal that is ADC sampled from the current or the voltage applied to the target resonator into a frequency domain signal using the DFT or the FFT. The circular shifter 375 may perform a circular shift of the frequency domain signal by a predetermined frequency. For example, the circular shifter 375 may circular shift a frequency domain signal to a baseband signal. The circular shifter 375 may circular shift the frequency domain signal by a predetermined frequency, to facilitate a filtering by the filtering unit 377.

The filtering unit 377 may generate a signal from which a harmonic component is removed, for example, by applying low-pass filtering to the circular-shifted signal. The inverse transformer 379 may transform the signal from which a harmonic component is removed, into a time domain signal using the inverse DFT or the inverse FFT. For example, the transformed time domain signal may indicate an envelope of a waveform of a current or a voltage applied to the target resonator.

As another example, the down conversion unit 371 may generate a down-converted signal by multiplying one of the predetermined signal waveforms of resonant frequency by a signal that is ADC sampled from a current or a voltage applied to the target resonator. The filtering unit 377 may generate a signal from which a harmonic component is removed by applying low-pass filtering to the down-converted signal using convolution in a time domain. The filtering unit 377 may perform low-pass filtering in a frequency domain in addition to the time domain. In this example, the signal from which a harmonic component is removed may indicate an envelope of a waveform of a current or a voltage applied to the target resonator.

As described herein, the envelope detector 370 may detect an envelope in a waveform of a current or a voltage that is applied to the target resonator using various signal processing schemes in a digital domain.

A state before mutual resonance occurs between the target resonator and the source resonator may be defined as an idle listen state. In this example, the idle listen state may indicate a state of preparing for a mutual resonance. The controller 330 may maintain the target resonator to be in an activated state so that the target resonator may receive energy promptly through mutual resonance in response to the source resonator transmitting energy while the target resonator is in the idle listen state. Maintaining the target resonator in an activated state may include maintaining the target resonator in a self-resonance state, which may correspond to a case of turning the switch on in the RI system of FIG. 1, and may correspond to a case of turning the switch off in the RI system of FIG. 2.

The peak point detector 380 may detect a peak point corresponding to a point at which an amplitude of the detected envelope reaches a maximum value or a predetermined value. The capturing unit 390 may capture the energy stored in the target resonator at the detected peak point.

As an example, the controller 330 may control the target resonator to start mutual resonance at the estimated starting point of the mutual resonance, and may control an operation of capturing energy stored in the target resonator at the detected peak point and delivering the captured energy to a load.

The controller 330 may control a switch connected to the target resonator using the starting point of the mutual resonance as a point in time of time synchronization between the target resonator and the source resonator. The RI system of FIG. 1 is a case in which the switch is turned on, and the RI system of FIG. 2 is a case in which the switch is turned off. After the point in time of time synchronization, the reception end may receive information through energy stored in the target resonator.

As another example, the controller 330 may control the switch connected to the target resonator at the peak point so that the energy stored in the target resonator may be delivered to the load. In this example, the RI system of FIG. 1 is a case in which the switch is turned off, and the RI system of FIG. 2 is a case in which the switch is turned on.

The receiver 340 may receive energy that is transmitted from the source resonator based on the starting point of the mutual resonance. The demodulator 350 may demodulate information transmitted from the source resonator, for example, based on an amount of energy received. The modulator 360 may modulate information transmitted to the source resonator depending on a mutual resonance between the source resonator and the target resonator and based on the starting point of the mutual resonance.

The controller 330 may perform an overall control of the communication device using wireless power. In some examples, the controller may perform a function of one or more of the calculator 310, the estimation unit 320, the receiver 340, the demodulator 350, the modulator 360, the envelope detector 370, the peak point detector 380, and the capturing unit 390, which are separately illustrated in FIG. 3 so as to describe each function separately. Thus, the controller 330 may be constructed to process all functions, and may be constructed to process a portion of the functions.

Figure 4:
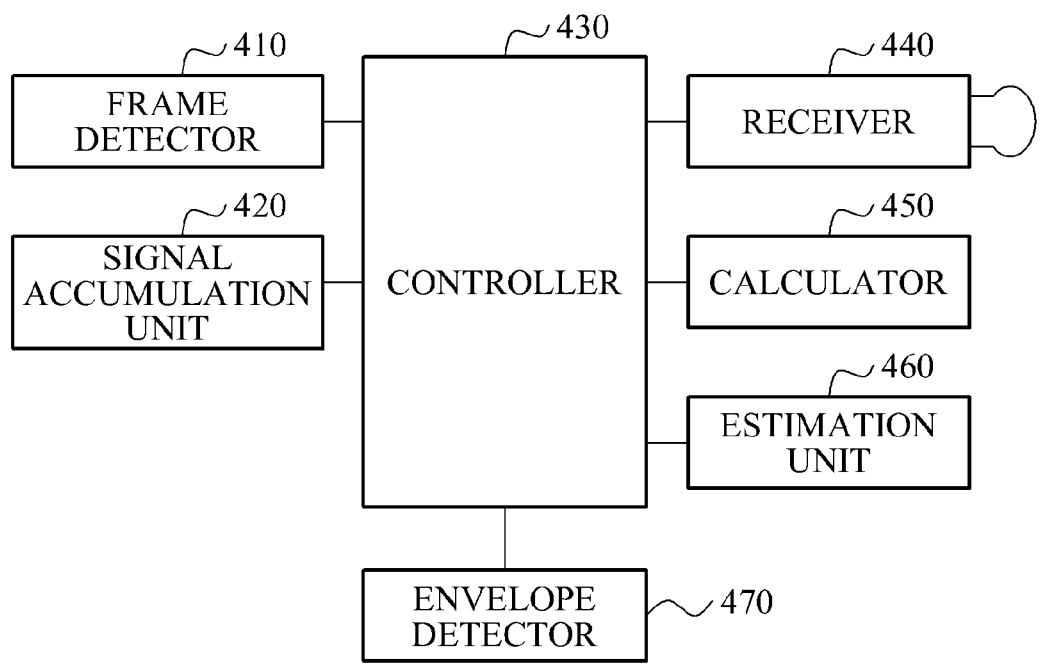
FIG. 4 is a diagram illustrating another example of a communication device using wireless power.

FIG. 4 illustrates another example of a communication device using wireless power.

Referring to FIG. 4, the communication device includes a frame detector 410, a signal accumulation unit 420, a controller 430, a receiver 440, a calculator 450, an estimation unit 460, and an envelope detector 470.

The receiver 440 may receive a frame through mutual resonance between a target resonator and a source resonator. For example, the frame may include an energy packet.

The frame detector 410 may detect a frame that is transmitted from the source resonator using a sliding window. For example, the frame detector 410 may detect a frame transmitted from the source resonator by measuring a magnitude of a signal applied to the target resonator in a predetermined sliding window period. Here, the magnitude of a signal applied may refer to an amount of energy such as a magnitude of a voltage or a current applied to the target resonator.

The frame detector 410 may recognize the frame as being transmitted from the source resonator if a signal greater than or equal to a predetermined magnitude is detected in the predetermined sliding window period. In various examples, the frame may include a preamble region and a body region.

The preamble region may be used to detect the frame transmitted from the source resonator, to estimate the starting point of the mutual resonance between the source resonator and the target resonator, and to detect a capture point of the energy stored in the target resonator. Time synchronization may be performed between a transmission end and a reception end by estimating the starting point of the mutual resonance between the source resonator and the target resonator during a time period of the preamble region, and by detecting the capture point.

The body region may be used for transmitting energy and transmitting data from the source resonator to the target resonator. For example, after time synchronization is performed in the time period of the preamble region, the reception end may receive energy and data from the transmission end during a time period of the body region.

The signal accumulation unit 420 may accumulate signals that are applied to the target resonator in a predetermined period including the predetermined sliding window period. The envelope detector 470 may detect an envelope of the accumulated signals.

The calculator 450 may calculate a slope of a detected envelope. The calculator 450 may calculate a slope between two points that have a predetermined interval in the detected envelope. For example, the calculator 450 may calculate a slope of a tangent at a plurality of points along the detected envelope. The estimation unit 460 may estimate a point placed within a predetermined interval around a point at which the slope reaches a maximum as a starting point of the mutual resonance between the source resonator and the target resonator. The controller 430 may control the target resonator to start a mutual resonance at the estimated starting point of the mutual resonance.

The controller 430 may perform an overall control of the communication device, and may perform a function of one or more of the frame detector 410, the signal accumulation unit 420, the receiver 440, the calculator 450, the estimation unit 460, and the envelope detector 470, which are separately illustrated in FIG. 4 to describe each function separately. Thus, the controller 430 may be constructed to process all functions, and or be constructed to process a portion of the functions of the communication device.

Figure 5:
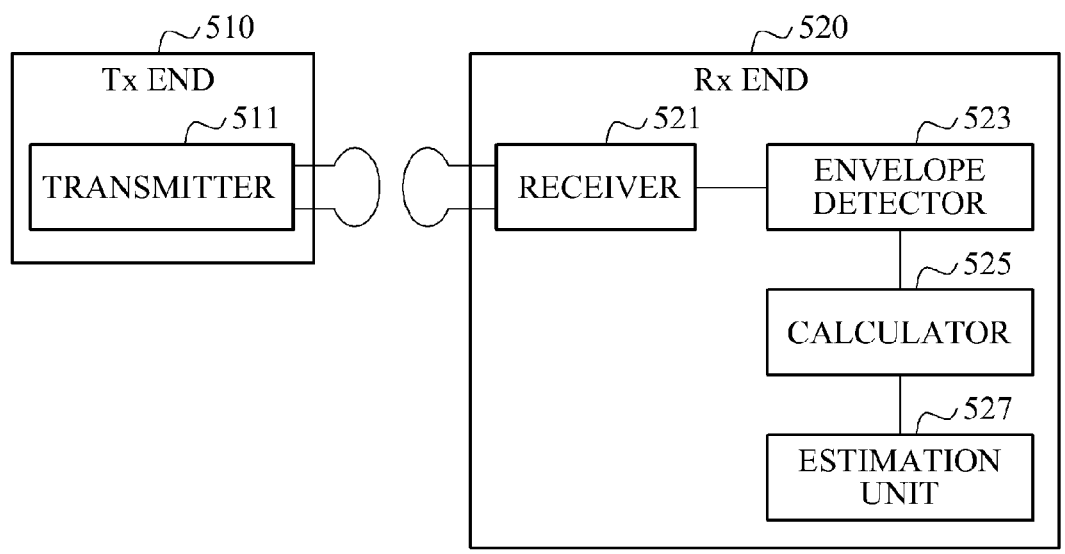
FIG. 5 is a diagram illustrating another example of a communication system using wireless power.

FIG. 5 illustrates another example of a communication system using wireless power.

Referring to FIG. 5, the communication system includes a transmission (Tx) end 510 and a reception (Rx) end 520. The Tx end 510 may correspond to a transmission end for transmitting wireless power and data, and the Rx end 520 may correspond to a reception end for receiving wireless power and data.

In this example, the Tx end 510 includes a transmitter 511. The transmitter 511 may transmit energy stored in a source resonator to a target resonator through mutual resonance.

The Rx end 520 includes a receiver 521, an envelope detector 523, a calculator 525, and an estimation unit 527. The receiver 521 may receive energy transmitted from the source resonator through mutual resonance. The envelope detector 523 may detect an envelope in a waveform of energy stored in the target resonator. The calculator 525 may calculate a slope of the detected envelope. The estimation unit 527 may estimate a point in time at which the calculated slope of the envelope reaches a maximum or a predetermined threshold to be a starting point of the mutual resonance between the source resonator and the target resonator. The Rx end 520 may perform time synchronization with the Tx end 510 through the estimated starting point of mutual resonance. The Rx end 520 may receive data based on the starting point of the mutual resonance.

Figure 6:
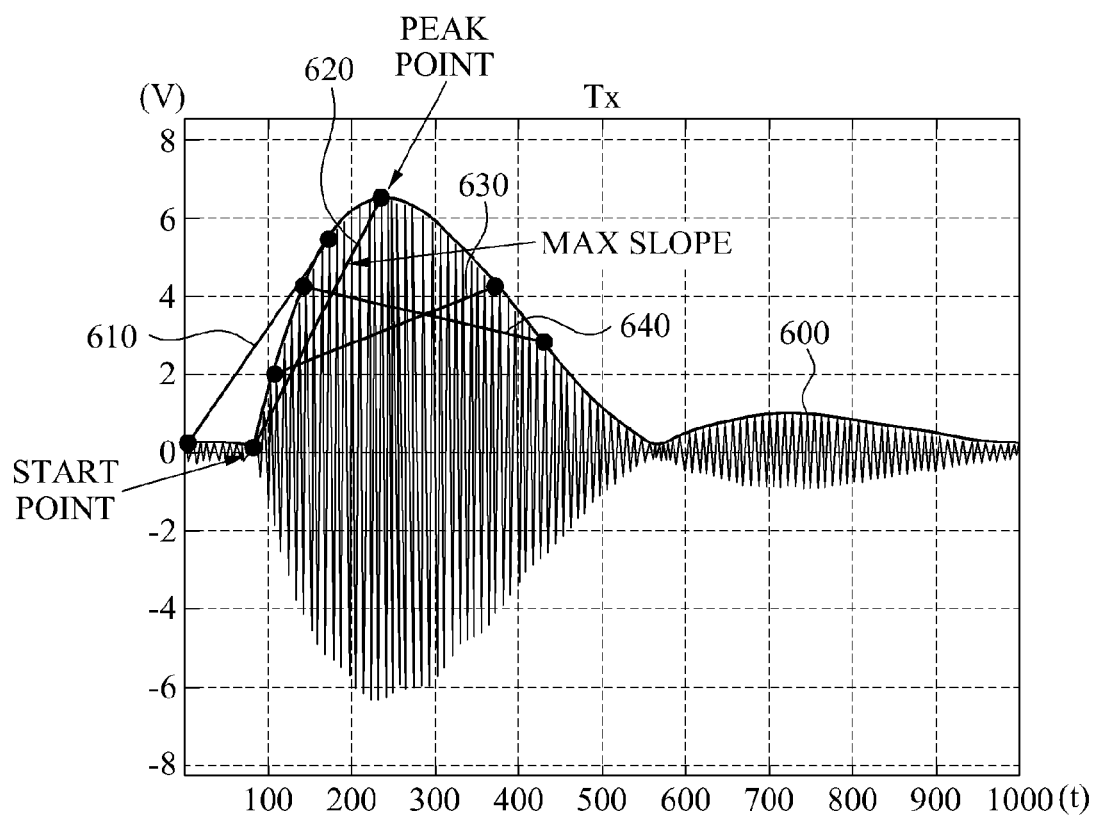
FIG. 6 is an example of a graph illustrating slopes of an envelope used for estimating a starting point of a mutual resonance.

FIG. 6 illustrates an example of slopes of an envelope used for estimating a starting point of mutual resonance.

In this example, envelope 600 is detected from a waveform of a voltage applied to a target resonator, and a slope between two points that have a predetermined interval is calculated. FIG. 6 illustrates four slopes corresponding to slopes 610, 620, 630, and 640. Referring to the slopes 610, 620, 630, and 640, a slope may have a maximum value at a starting point of mutual resonance. If a slope of the envelope is at a maximum, an initial point between two points having a predetermined interval may be estimated as the starting point of the mutual resonance. In this instance, energy may be captured at a peak point at which energy stored in the target resonator has a peak value. The target resonator may mutually resonate with a source resonator between the starting point of a mutual resonance and the peak point.

Figure 7:
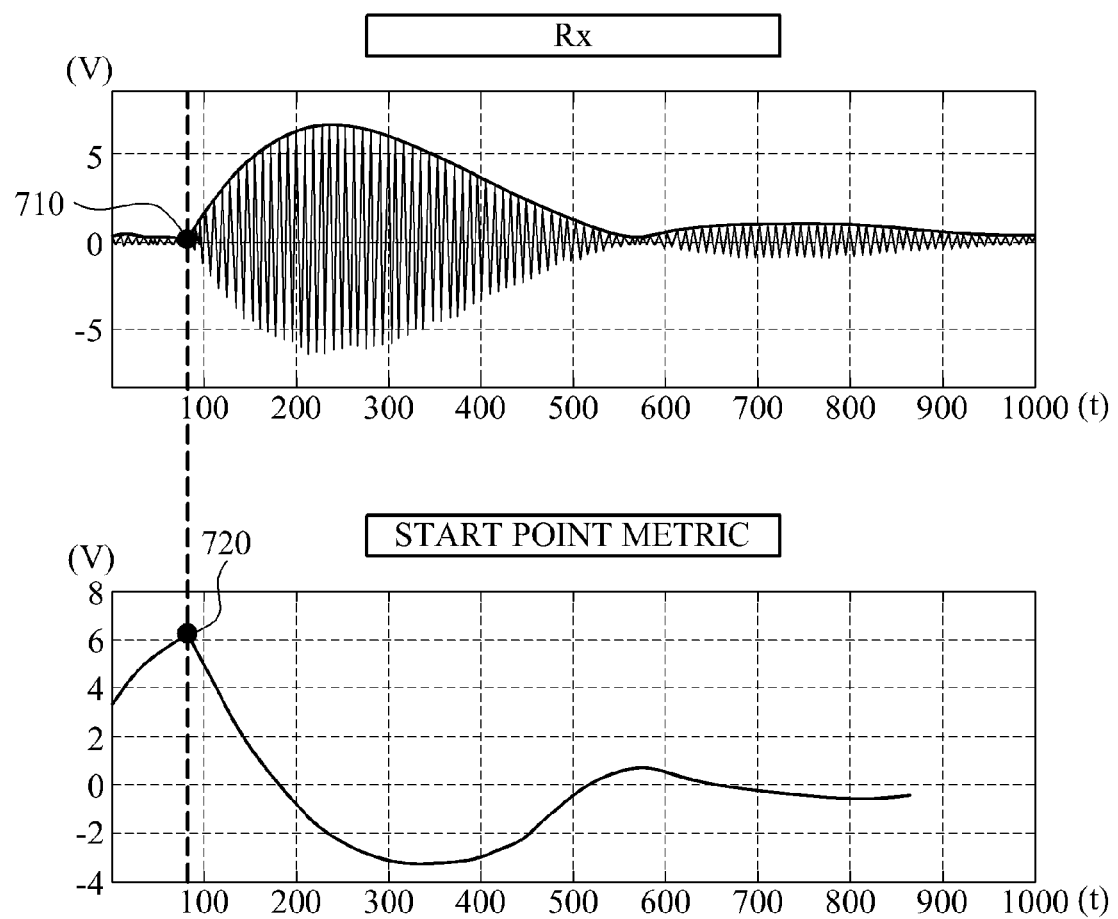
FIG. 7 is an example of a graph illustrating an envelope of a waveform of energy stored in a target resonator and a slope value at each point on the envelope.

FIG. 7 illustrates an example of an envelope of a waveform of energy stored in a target resonator and a slope value at each point on the envelope.

Referring to FIG. 7, a point 710 at which a mutual resonance starts on an envelope of a waveform of a voltage applied to a target resonator at an Rx end matches a point 720 at which a slope of an envelope corresponds to a maximum in a starting point metric. The point 720 at which a slope of an envelope corresponds to a maximum may be estimated as the point 710 at which a mutual resonance starts.

Figure 8:
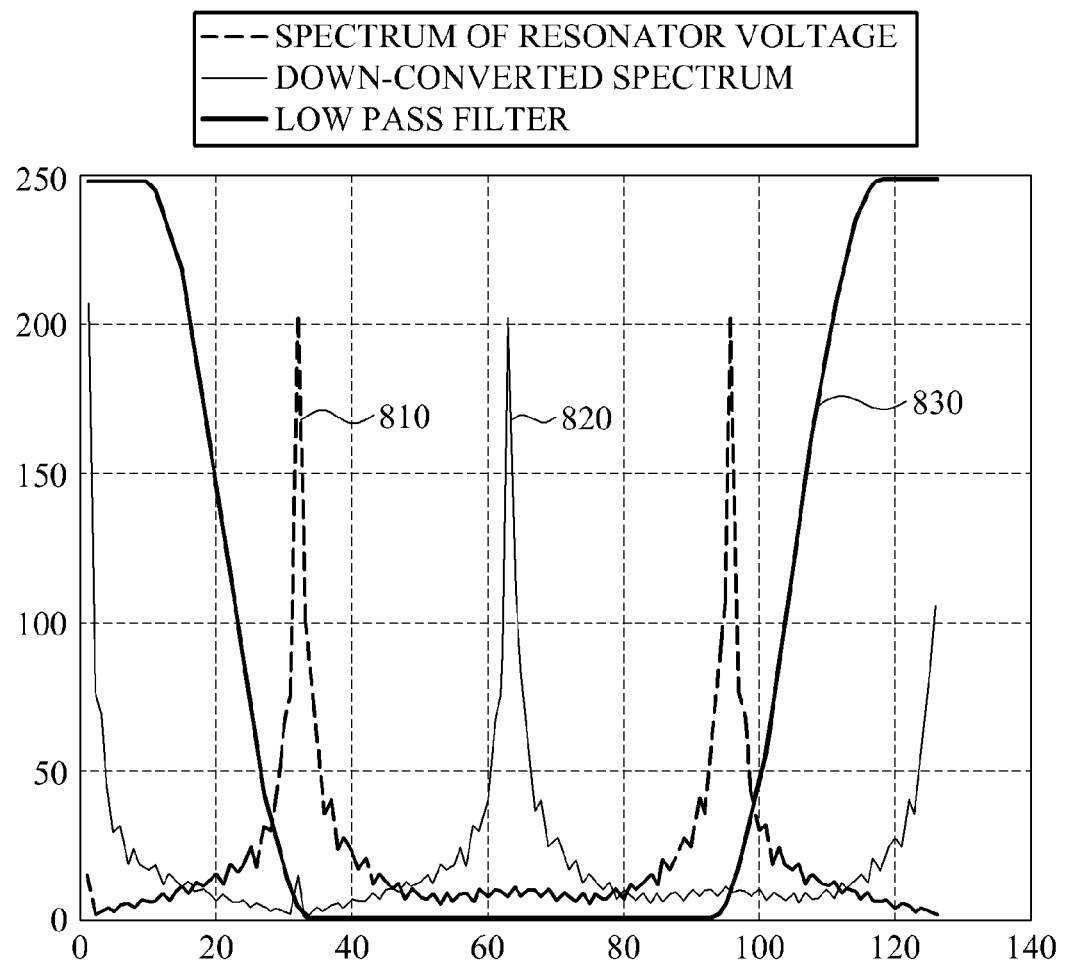
FIG. 8 is an example of a graph illustrating elements of a communication device used for a signal processing operation for detecting an envelope.

FIG. 8 illustrates an example of elements of a communication device used for a signal processing operation for detecting an envelope in a communication device using wireless power.

Referring to FIG. 8, the communication device may detect an envelope by applying signal processing to a current or a voltage applied to a target resonator. Further, by cyclically shifting a spectrum 810 that expresses a waveform of the voltage applied to the target resonator on a frequency domain, a spectrum 820 down-converted to a baseband may be generated. The spectrum 820 down-converted to a baseband may be filtered through a low-pass filter 830. In this example, the envelope may be calculated by transforming a filtered signal to a time domain signal, and performing an absolute operation on the time domain signal.

Figure 9:
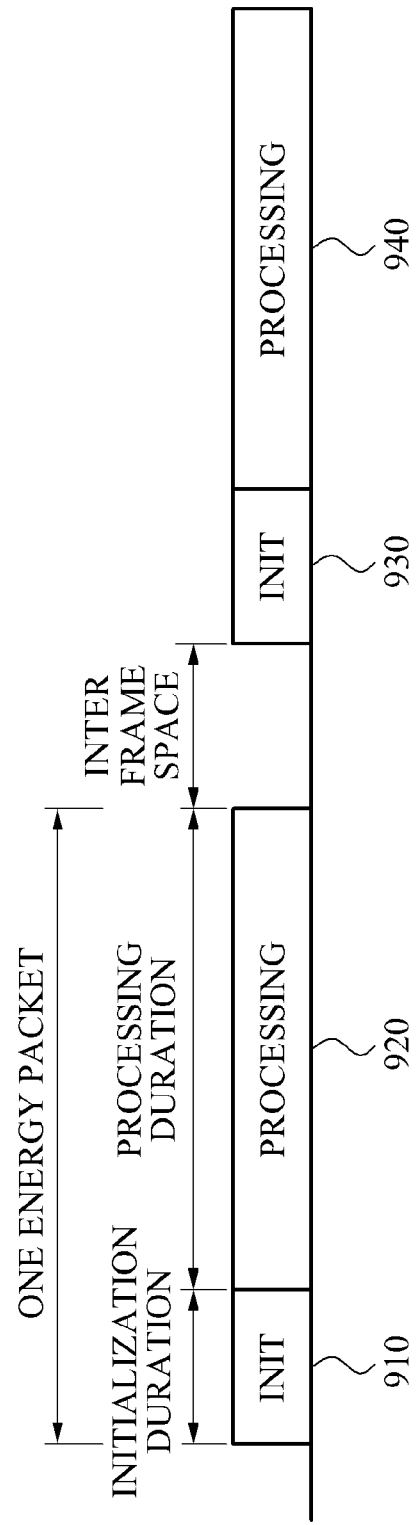
FIG. 9 is a diagram illustrating an example of a format of a frame for time synchronization and a detection of a peak point.

FIG. 9 illustrates an example of a format of a frame for time synchronization and a detection of a peak point in a communication device using wireless power.

Referring to FIG. 9, a frame includes a preamble region and a body region. During an initialization period 910 corresponding to a time period of the preamble region, a reception end may perform time synchronization with a transmission end. For example, time synchronization may be performed by estimating a starting point of a mutual resonance, and by detecting a peak point. During a processing period 920 corresponding to a time period of the body region, the reception end may receive energy and data from the transmission end. In this example, data is allocated to an amount of energy stored in the reception end. That is, the frame may be defined to include a single energy packet.

An inter frame space may be used to differentiate frames if another frame is received by the reception end. The reception end may receive another frame, perform time synchronization during an initialization 930, and receive energy and data in a processing duration 940.

Figure 10:
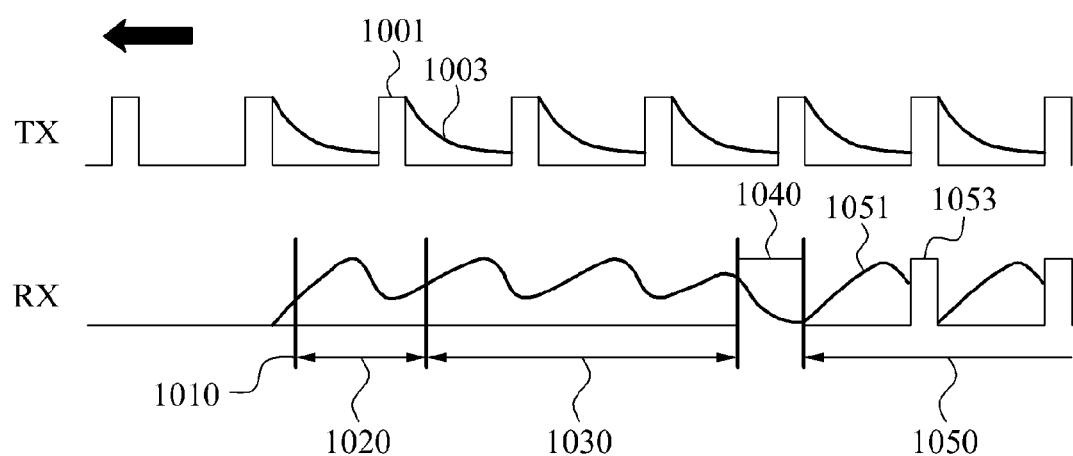
FIG. 10 is a diagram illustrating an example of an operation of estimating time synchronization with a transmission end based on a signal applied to a reception end.

FIG. 10 illustrates an example of an operation of estimating time synchronization with a transmission end based on a signal applied to a reception end in a communication device using wireless power.

Referring to FIG. 10, a source resonator may be charged in response to a switch at a transmission (TX) end being turned on in 1001, and may be discharged in response to the switch being turned off in 1003.

A reception (RX) end may maintain a switch to be in an off state, that is, an activated state before time synchronization.

In response to energy being transmitted at the TX end, the RX end may detect a signal applied to a target resonator through a mutual resonance at 1010. The RX end may accumulate the applied signal during a predetermined period 1020. Based on the accumulated signal, the RX end may detect an envelope during a time synchronization period 1030, estimate a starting point of a mutual resonance, and detect a peak point.

After time synchronization, the RX end may turn the switch on in 1040 to terminate the mutual resonance, and may turn the switch off at the estimated starting point of the mutual resonance to receive energy and data from the TX end. During a processing duration 1050, the RX end may receive energy from the TX end in 1051 and 1053. The RX end may demodulate energy based on an amount of the received energy.

Figure 11:
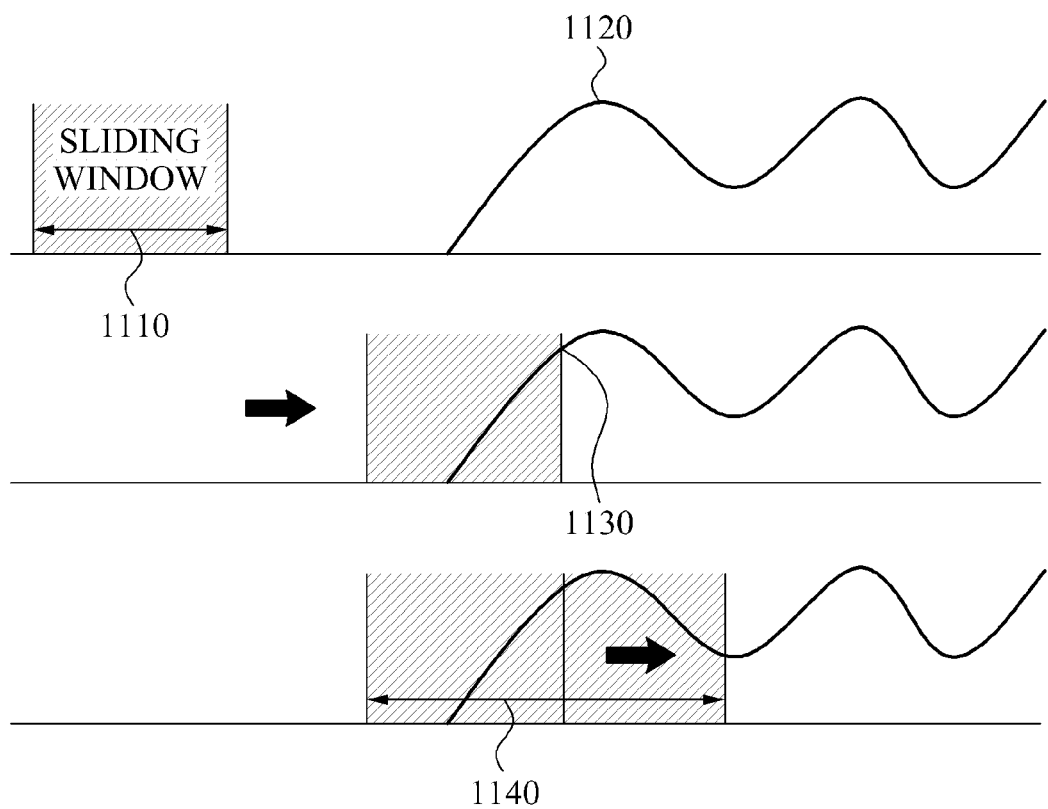
FIG. 11 is a diagram illustrating an example of an operation of estimating time synchronization using a sliding window.

FIG. 11 illustrates an example of an operation of estimating time synchronization using a sliding window in a communication device using wireless power.

Referring to FIG. 11, a communication device using wireless power may detect a signal 1120 applied to a target resonator using a sliding window 1110. A frame stored in the target resonator may be detected in 1130 based on a magnitude of a signal estimated in the sliding window 1110. The frame may be defined in a form of an energy sequence. The communication device may accumulate a signal applied in a predetermine period 1140 including the sliding window 1110, detect an envelope from the accumulated signal, calculate a slope of the detected envelope, and estimate a point of having a maximum slope as a starting point of a mutual resonance.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication device using wireless power, the communication device comprising:
   a calculator configured to calculate a slope of a line connecting points on an envelope of a waveform, the waveform representing energy stored in a target resonator as a result of mutual resonance between a source resonator and the target resonator;
an estimation unit configured to estimate a first point on the envelope, placed within a predetermined interval around a second point on the envelope at which the slope reaches a maximum, the first point representing a starting point of the mutual resonance between the source resonator and the target resonator.

2. The communication device of claim 1, further comprising:
an envelope detector configured to detect an envelope of a waveform, the waveform representing a current or a voltage applied to the target resonator.

3. The communication device of claim 2, wherein the calculator is further configured to calculate a slope between two points on the envelope, the two points having a predetermined interval on the detected envelope.

4. The communication device of claim 2, wherein the calculator is further configured to calculate a slope of a tangent at each of a plurality of points on the detected envelope.

5. The communication device of claim 1, further comprising:
a frame detector configured to detect a frame transmitted from the source resonator, by measuring a magnitude of a signal applied to the target resonator during a predetermined sliding window period.

6. The communication device of claim 5, wherein the frame comprises:
a preamble region used to detect the frame transmitted from the source resonator, to estimate the starting point of the mutual resonance between the source resonator and the target resonator, and to detect a capture point of the energy stored in the target resonator, and
a body region used to transmit energy, and transmit data, from the source resonator to the target resonator.

7. The communication device of claim 1, further comprising:
a controller configured to maintain the target resonator in an activated state, so that the target resonator promptly receives energy as a result of mutual resonance, in response to the source resonator transmitting energy.

8. The communication device of claim 5, further comprising:
a signal accumulation unit configured to accumulate signals applied to the target resonator, during a predetermined period including the predetermined sliding window period.

9. The communication device of claim 8, wherein the calculator is further configured to calculate a slope of a line connecting points on an envelope, the envelope detected from the accumulated signals.

10. The communication device of claim 2, wherein the envelope detector is configured to acquire the envelope from an output of an analog circuit configured to detect an envelope, in response to an input of the current or the voltage.

11. The communication device of claim 2, wherein the envelope detector comprises:
a down conversion unit configured to generate a down-converted signal, by multiplying a predetermined signal waveform representing a resonant frequency with a signal that is analog-digital conversion (ADC) sampled from the current or the voltage;
a transformer configured to transform the down-converted signal into a frequency domain signal using the discrete Fourier transform (DFT) or the fast Fourier transform (FFT);
a filtering unit configured to generate a signal from which a harmonic component is removed, by applying low-pass filtering to the frequency domain signal; and
an inverse transformer configured to transform the signal from which a harmonic component is removed, into a time domain signal using the inverse DFT or the inverse FFT.

12. The communication device of claim 2, wherein the envelope detector comprises:
a transformer configured to transform a signal that is ADC sampled from the current or the voltage into a frequency domain signal using the DFT or the FFT;
a circular shifter configured to perform a circular shift of the frequency domain signal, by a predetermined frequency;
a filtering unit configured to generate a signal from which a harmonic component is removed, by applying low-pass filtering to the circular-shifted signal; and
an inverse transformer configured to transform the signal from which a harmonic component is removed, into a time domain signal using the inverse DFT or the inverse FFT.

13. The communication device of claim 2, wherein the envelope detector comprises:
a down conversion unit configured to generate a down-converted signal, by multiplying a predetermined signal waveform representing a resonant frequency with a signal that is ADC sampled from the current or the voltage; and
a filtering unit configured to generate a signal from which a harmonic component is removed, by applying low-pass filtering to the down-converted signal using convolution in a time domain.

14. The communication device of claim 2, further comprising:
a peak point detector configured to detect a peak point on the envelope, corresponding to a point at which an amplitude of the detected envelope reaches a maximum value; and
a capturing unit configured to capture the energy stored in the target resonator at the detected peak point.

15. The communication device of claim 1, further comprising:
a receiver configured to receive energy transmitted from the source resonator, by activating a self-resonance of the target resonator, based on the starting point of the mutual resonance;
a demodulator configured to demodulate information transmitted by the source resonator, based on an amount of energy received; and
a modulator configured to modulate information transmitted to the source resonator, based on a mutual resonance between the source resonator and the target resonator.

16. A communication method using wireless power, the communication method comprising:
calculating a slope of a line connecting points on an envelope of a waveform, the waveform representing energy stored in a target resonator as a result of mutual resonance between a source resonator and the target resonator;
estimating a first point on the envelope, placed within a predetermined interval around a second point on the envelope at which the slope reaches a maximum, the first point representing a starting point of the mutual resonance between the source resonator and the target resonator; and storing at least one of the first point and the second point in a non-transitory computer-readable medium.

17. The communication method of claim 16, further comprising:
  detecting an envelope, in a waveform representing a current or a voltage applied to the target resonator.

18. The communication method of claim 17, wherein the calculating comprises calculating a slope between two points on the envelope, the two points having a predetermined interval on the detected envelope.

19. The communication method of claim 16, further comprising:
  maintaining the target resonator in an activated state, so that the target resonator promptly receives energy as a result of mutual resonance, in response to the source resonator transmitting energy.

20. The communication method of claim 17, further comprising:
  detecting a peak point on the envelope, corresponding to a point at which an amplitude of the detected envelope reaches a maximum value; and
  capturing the energy stored in the target resonator at the detected peak point.

21. A communication system using wireless power, the communication system comprising:
  a transmitter configured to transmit energy stored in a source resonator to a target resonator, as a result of mutual resonance;
  an envelope detector configured to detect an envelope of a waveform representing energy stored in the target resonator, the energy being stored as a result of the mutual resonance;
  a calculator configured to calculate a slope of a line connecting points on the detected envelope;
  an estimation unit configured to estimate a first point on the envelope, placed within a predetermined interval around a second point on the envelope at which the slope reaches a maximum, the first point representing a starting point of the mutual resonance between the source resonator and the target resonator.

* * * * *